(12) United States Patent
Padmanabhan et al.

(10) Patent No.: US 8,539,005 B2
(45) Date of Patent: Sep. 17, 2013

(54) METHOD AND SYSTEM FOR CONFIGURING AND VISUALIZING AN EXTRUDER

(75) Inventors: Babu Padmanabhan, Bangalore (IN); Pradeep Bakshi, Bangalore (IN)

(73) Assignee: Steer Information Technologies Pvt. Ltd., Bangalore (IN)

( * ) Notice: Subject to any disclaimer, the term of this patent is extended or adjusted under 35 U.S.C. 154(b) by 0 days.

(21) Appl. No.: 13/496,857

(22) PCT Filed: Feb. 24, 2010

(86) PCT No.: PCT/IN2010/000107
§ 371 (c)(1),
(2), (4) Date: Mar. 16, 2012

(87) PCT Pub. No.: WO2011/033522
PCT Pub. Date: Mar. 24, 2011

(65) Prior Publication Data
US 2012/0179649 A1     Jul. 12, 2012

(30) Foreign Application Priority Data
Sep. 18, 2009   (IN) ............................ 2261/CHE/2009

(51) Int. Cl.
*G06F 7/00*         (2006.01)

(52) U.S. Cl.
USPC ......................................................... 707/805

(58) Field of Classification Search
USPC ......................................................... 707/948
See application file for complete search history.

(56) References Cited

U.S. PATENT DOCUMENTS
5,815,154 A   9/1998   Hirschtick et al.
6,219,049 B1   4/2001   Zuffante et al.
6,219,055 B1   4/2001   Bhargava et al.
6,629,065 B1   9/2003   Gadh et al.
2002/0184111 A1*  12/2002   Swanson ........................ 705/26

FOREIGN PATENT DOCUMENTS
WO       WO 00/19381       4/2000

OTHER PUBLICATIONS

Compuplast VEL Extruder, http://www.compuplast.com/ExtruderProductsDescription.shtml, Dec. 10, 2007, 1 page.
Win TXU Screw Configuration Manager, http://web.archive.org/web/20070711013552/http://www.b4uextrude.com/images/NEW_WinTXU_Presentation.ppt, Oct. 22, 2007, 22 pages.
International Search Report issued in PCT/IN2010/000107 dated Jul. 12, 2010, 4 pages.
Padmanabhan, "The Heart of a Twin Screw Extruder is EPZ," *The Extruder Times*, Issue 5, pp. 1-12 (Jan.-Mar. 2008).

* cited by examiner

*Primary Examiner* — Robert Beausoliel, Jr.
*Assistant Examiner* — Nirav K Khakhar
(74) *Attorney, Agent, or Firm* — Klarquist Sparkman, LLP

(57) ABSTRACT

An extruder configuration system is disclosed. The system includes an extruder information database including details of extruders, extruder elements and extruder barrels, a user interface configured to receive user inputs including user choices of extruders, extruder elements or extruder barrels from the extruder information database, the user interface further configured to receive extruders, extruder elements or extruder barrels for addition to the extruder information database, an element positioning engine including a database of incompatible elements and configured to review user choices and prevent positioning of incompatible extruder elements adjacent to each other on an extruder, a processor configured to create an extruder configuration based on user inputs and a display module configured to display the extruder configuration.

18 Claims, 12 Drawing Sheets

METHOD AND SYSTEM FOR CONFIGURING AND VISUALIZING AN EXTRUDER

CROSS REFERENCE TO RELATED APPLICATIONS

This is the U.S. National Stage of International Application No. PCT/IN2010/000107, filed Feb. 24, 2010, which in turn claims the benefit of India Patent Application No. 2261/CHE/2009, filed in India on Sep. 18, 2009. Both applications are incorporated by reference herein in their entirety.

The invention generally relates to a method and system for visualizing, designing, comparing and sharing data for the configuration of barrels and screw elements in an extruder.

BACKGROUND

An extruder is a type of device used in the manufacture of material mixtures or compounds. The function of an extruder includes the process of heating, melting, pressurizing and homogenizing materials through the means of a rotating screw. An extruder may contain a single rotating screw, or two rotating screws. There are several types of extruders extant in the art.

Fundamentally, an extruder consists of a long cylinder or shaft. Extruder screw elements are mounted one after the other in a continuous chain on the shaft. The shape and design of the elements mounted on the shaft vary depending on the specific process being undertaken within the extruder. Several types of barrels and elements are known in the art. Enclosing the extruder shaft is a long barrel-like device that essentially joins together several smaller barrels. The shape and design of the smaller barrels vary depending on the specific process being undertaken within the extruder. Several types of barrels are known in the art, and range from barrels for the purpose of intake, venting, cooling, heating, side-feeding, closed, and combinations thereof.

The design, layout and functioning of an extruder barrel and screw configuration would depend on the barrels and elements within, as well as the materials to be compounded using the device itself.

Designing and creating an extruder barrel and screw configuration requires sophisticated knowledge and understanding of materials science. Conventionally, scientists have designed and created extruder configurations after physically experimenting with a variety of barrels and elements to arrive at a desired barrel and screw configuration. Using such a method is a time-consuming and laborious task. It also brings with it the possibility of human error in putting together the parts of the extruder barrel and screw configuration, which can have implications on the eventual material being manufactured.

There is the need for a system that allows the visualization, design, and creation of barrel and screw configurations for extruders in the form of a virtual assemblage, prior to physically making the device.

SUMMARY

The disclosure relates to an extruder configuration system. The system includes an extruder information database including details of extruders, extruder elements and extruder barrels and a user interface configured to receive user inputs including user choices of extruders, extruder elements or extruder barrels from the extruder information database. The user interface is further configured to receive extruders, extruder elements or extruder barrels for addition to the extruder information database. The system further includes an element positioning engine including a database of incompatible elements and configured to review user choices and prevent positioning of incompatible extruder elements adjacent to each other on an extruder, a processor configured to create an extruder configuration based on user inputs and a display module configured to display the extruder configuration.

BRIEF DESCRIPTION OF ACCOMPANYING DRAWINGS

The accompanying drawings illustrate the preferred embodiments of the invention and together with the following detailed description serves to explain the principles of the invention.

DETAILED DESCRIPTION

Figure 1:
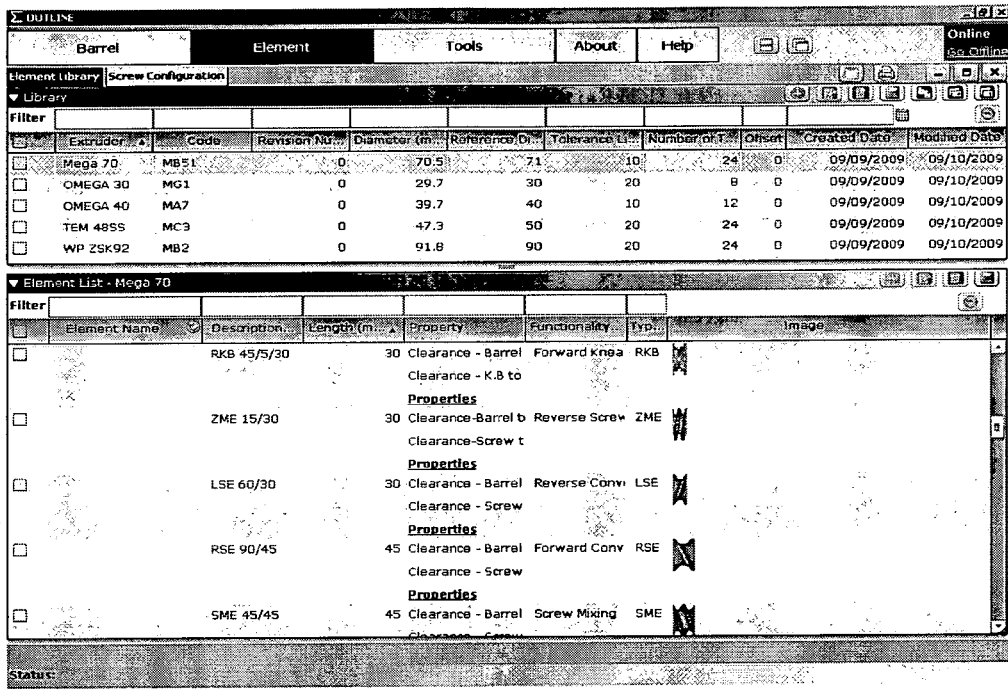
FIG. 1 illustrates a screenshot of the user interface of the library of elements in accordance with an embodiment.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "one embodiment", "an embodiment", or similar language means that a particular feature, structure, or characteristic described in connection with the embodiment is included in at least one embodiment of the present invention. Thus, appearances of the phrase "in one embodiment", "in an embodiment" and similar language throughout this specification may, but do not necessarily, all refer to the same embodiment.

Many of the functional units described in this specification have been labelled as modules, in order to more particularly emphasize their implementation independence. For example, a module may be implemented as a hardware circuit comprising custom very large scale integration circuits or gate arrays, off-the-shelf semiconductors such as logic, chips, transistors, or the other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions which may, for instance, be organised as an object, procedure, or function. Nevertheless, the executables of an identified module need not be physically located together, but may comprise disparate instructions stored in different locations which, when joined together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organised within any suitable type of data structure. The operational data maybe collected as a single data set, or may be distributed over different locations including over different member disks, and may exist, at least partially, merely as electronic signals on a system or network.

A method and system for visualizing, designing, comparing and sharing data for the configuration of an extruder is disclosed. Specifically, an extruder configuration system is disclosed.

The system comprises of a user interface configured for allowing a user to input specifications of a desired extruder configuration, a database of extruder elements, a database of extruder barrels, a database of element positioning rules and a processor configured for creating, validating, visualizing and comparing the extruder configuration.

Figure 15:
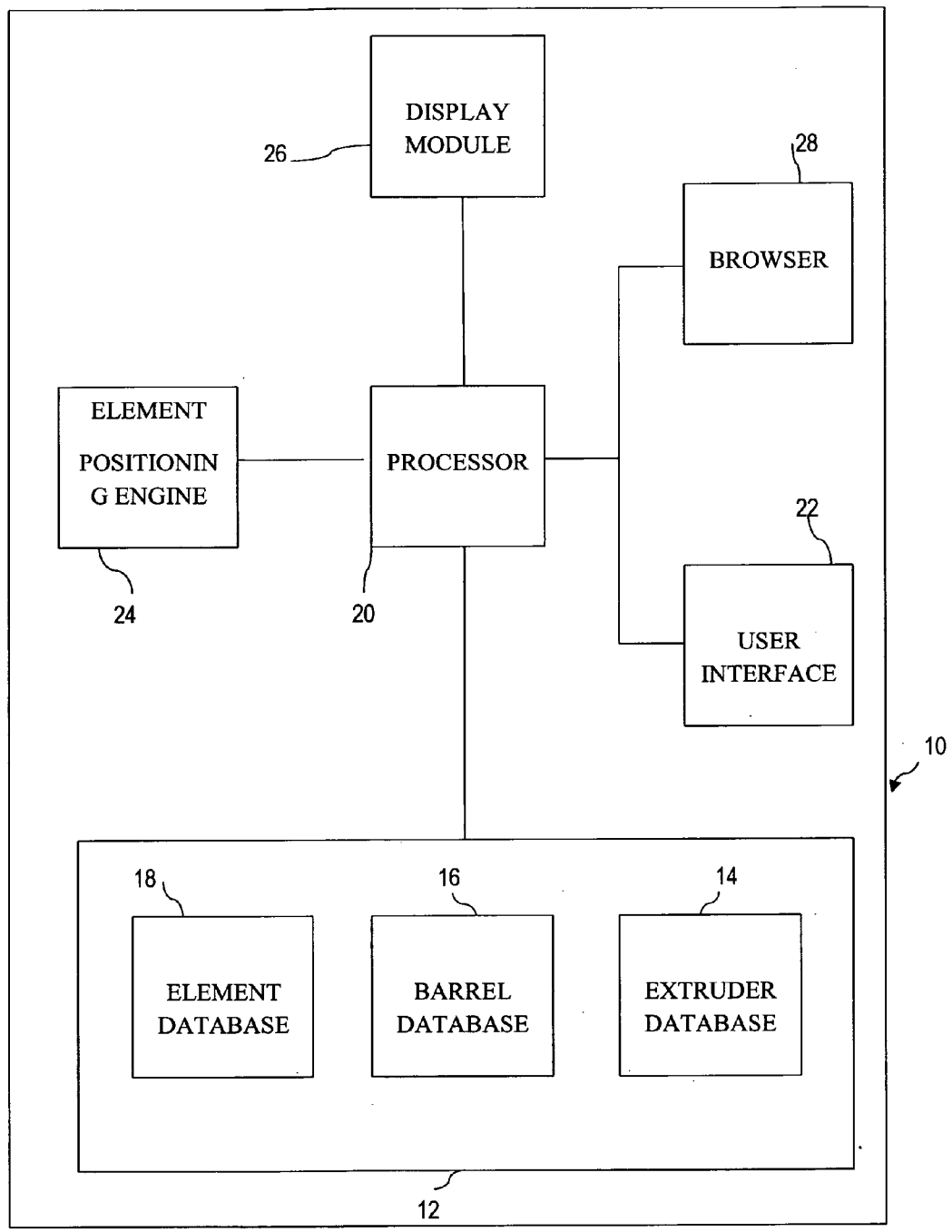
FIG. 15 illustrates an extruder configuration system in accordance with an aspect.

Referring to FIG. 15, the system 10 includes an extruder information database 12 that stores details of extruders, extruder elements and extruder barrels in a extruder database 14, a barrel database 16 and a element database 18 respectively. The extruder database 14, barrel database 16 and the element database 18 may be physically located in the same database or in separate database systems. The system 10 further includes an user interface 22, a processor 20, an element positioning engine 24 and a display module 26. The processor 20 is configured to execute the various modules in support of the extruder configuration system functionality and the display module is configured to display the extruder configurations on a display device.

The system is further described with reference to the accompanying drawings that represent screenshots of the user interface of the system. At the initial stage of configuration of the extruder, the user is required to input the specifications of the desired extruder configuration.

The data that may be required to be input by the user through the user interface 22 includes but is not limited to available length of the shaft and diameter of the shaft. Alternatively, the user may select an extruder, elements and barrels from the extruder information database. In addition the user may be required to provide specifications of barrel and screw elements that may be used to configure the extruder. Furthermore, the user may add details of extruders, elements or barrels to the extruder information database. The addition of the new extruders, elements or barrels may also include images of such extruders, elements and barrels and the user interface 22 is configured to receive such inputs.

In accordance with an aspect the interface of the system may provide a database of all extruder elements from which the user may choose the desired element by way of the element database 18. By way of an example and as illustrated in FIG. 1, the element database may include the name of the element, its description, its length, its properties, its functionality, the element type, and the image of the element. The user may rename the element, if so desired, to ensure it conforms to local naming conventions in use at the particular organization.

Figure 16:
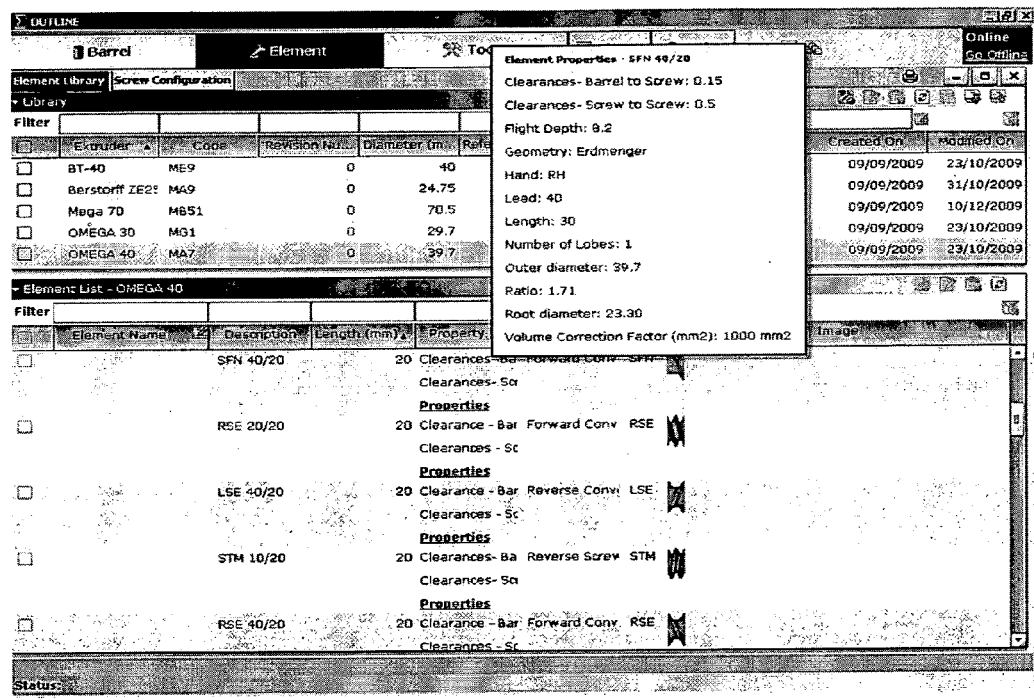
FIG. 16 illustrates a screenshot of the element library and element properties.

The element database 18 may also store details of element properties as illustrated in FIG. 16. Such properties include clearances between elements and clearances between element and barrels. The properties may also include flight depth, geometry, lead, length, number of lobes, outer diameter, ratio and root diameter. In accordance with an aspect, the display module is configured to display on a display device the element properties as a pop out screen when a cursor is brought on or in the vicinity of a particular element on the display device. Alternatively, the extruder configuration system may be configured to display the element properties when a request for element properties is received. A properties tab may receive the request. The properties popup provides easy and rapid access to a detailed list of all the attributes of a particular element. In the example illustrated, it becomes readily evident from the popup displayed for the RSE 40/40 element that the Clearance between the Barrel to Screw is 0.15 and that it is a Bilobed element (Number of Lobes: 2) etc.

Figure 2:
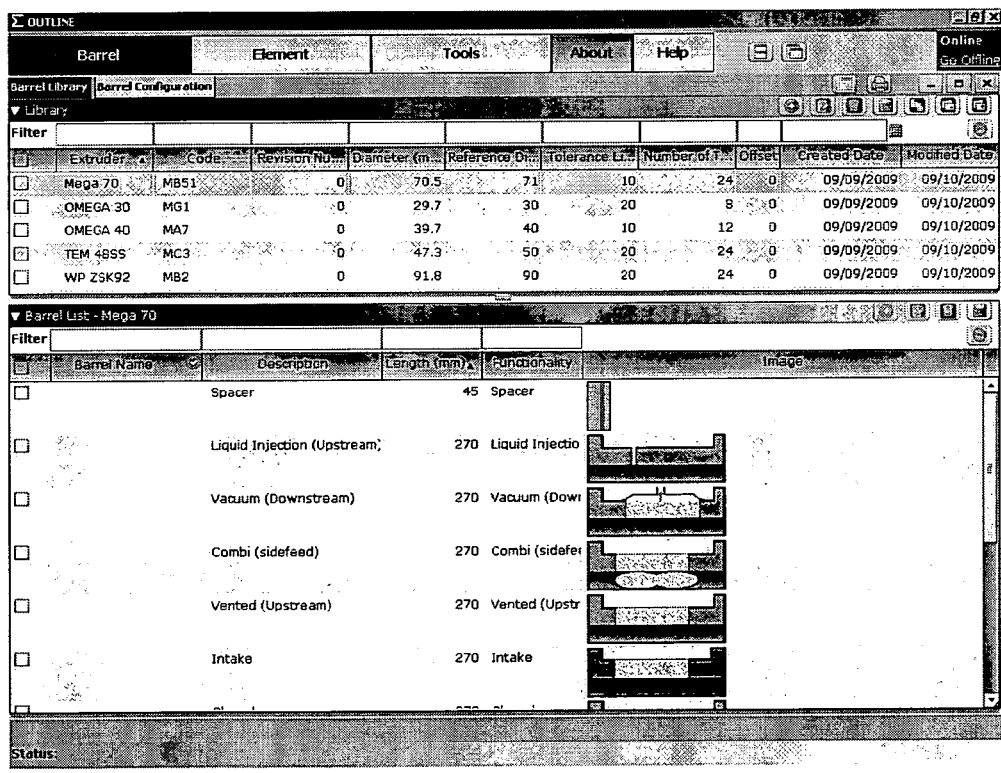
FIG. 2 illustrates a screenshot of the user interface of the library of barrels in accordance with an embodiment.

In accordance with an aspect the interface of the system may provide a database of all extruder barrels from which the user may choose the desired barrel by way of a barrel database 16. FIG. 2 illustrates the barrel database 16 that may be used to configure the extruder by way of an example. The barrel database may include the barrel name, its description, the length of the barrel, the functionality of the barrel, and a visual image of the barrel. The user may rename the barrel, if so desired, to conform to local naming conventions in use at the particular organization.

Once the details of the desired extruder configuration are input by the user, the system generates a configuration of the extruder based on the selection of barrels and elements. Once generated, the extruder configuration may be provided to the user in a visual form. The visual representation includes but is not limited to a pictorial representation of the extruder screw and its data specifications.

Figure 3:
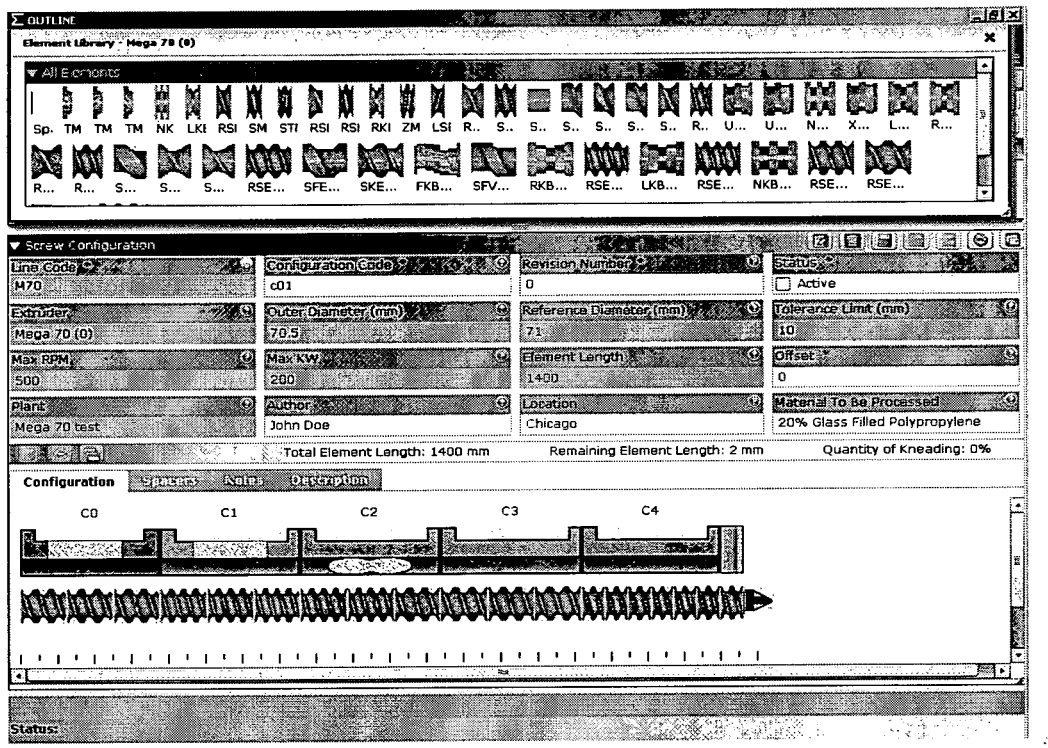
FIG. 3 illustrates a screenshot of the user interface of the screw configured based upon the inputs provided by the user in accordance with an embodiment.

With reference to FIG. 3, the system processes the various selections input by the user, as illustrated in FIG. 1 and FIG. 2, and configures a screw that comprises the various selections thus made. The configuration may be presented to the user in the form of a visual representation that brings together various details including but not limited to the line code, the configuration code, the revision number, the status, the name of the extruder, the outer diameter, the reference diameter, the tolerance limit, the maximum revolutions per minute, the maximum kilowatts, the element length, the offset, the plant, the author of the configuration, the location, the material to be processed, the total element length, the remaining element length and the quantity of kneading.

In accordance with an aspect, the system may allow the user to implement changes in the extruder configuration thus generated through the addition, deletion or other amendment to the screw and barrel specifications.

The system may also allow the user to zoom in on the extruder configuration providing a detailed view of the extruder. In accordance with an aspect, the system may track the changes made to an extruder configuration, and may permit the user to access and use previous versions of the configuration. In accordance with an aspect, the user configurations may be stored in the extruder database. The extruder database may be the extruder database 14 of the extruder information database or may be an independent database.

Figure 4:
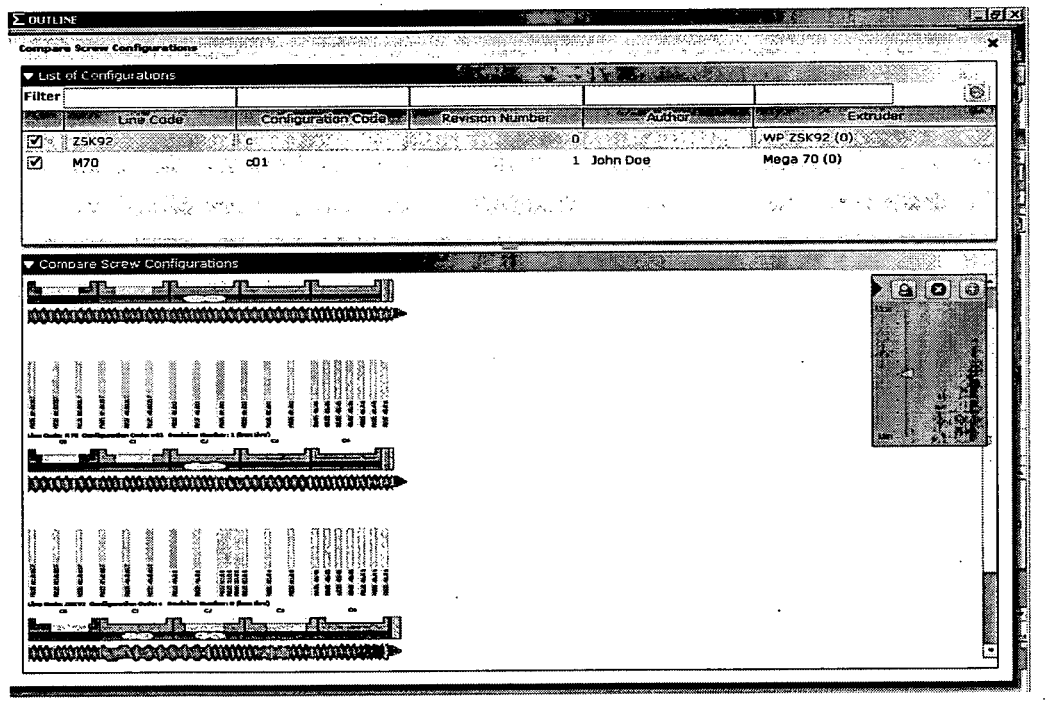
FIG. 4 illustrates a screenshot of the user interface comparing multiple configurations in accordance with an embodiment.

In accordance with an alternate embodiment, the system permits a user to compare multiple extruder configurations. By way of a specific example, FIG. 4 illustrates a screenshot comparing multiple extruder configurations. As illustrated the system provides a visual comparison of the configured extruder as compared to other configurations. The system may also permit the user to zoom into various zones of the extruder to obtain a detailed view of zonal specifications, and to understand the functioning of different configurations.

Figure 5:
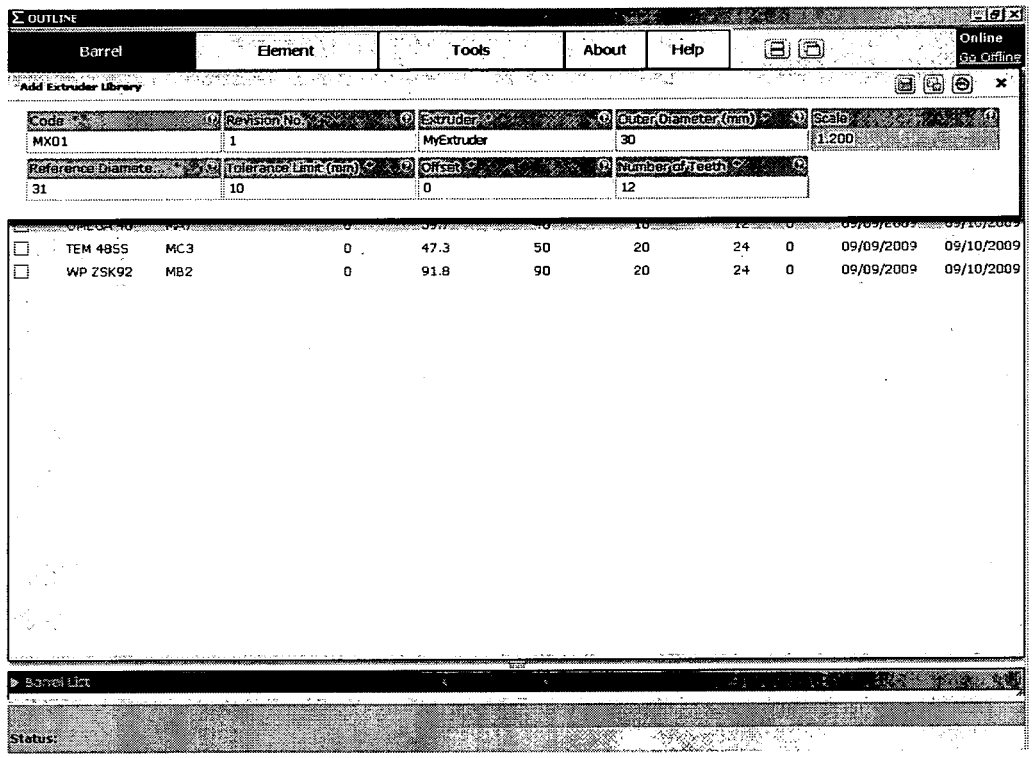
FIG. 5 illustrates a screenshot of the user interface adding an extruder.

In accordance with an aspect, the system may allow users to add a new extruder to a database of extruders, as illustrated in FIG. 5.

Figure 6:
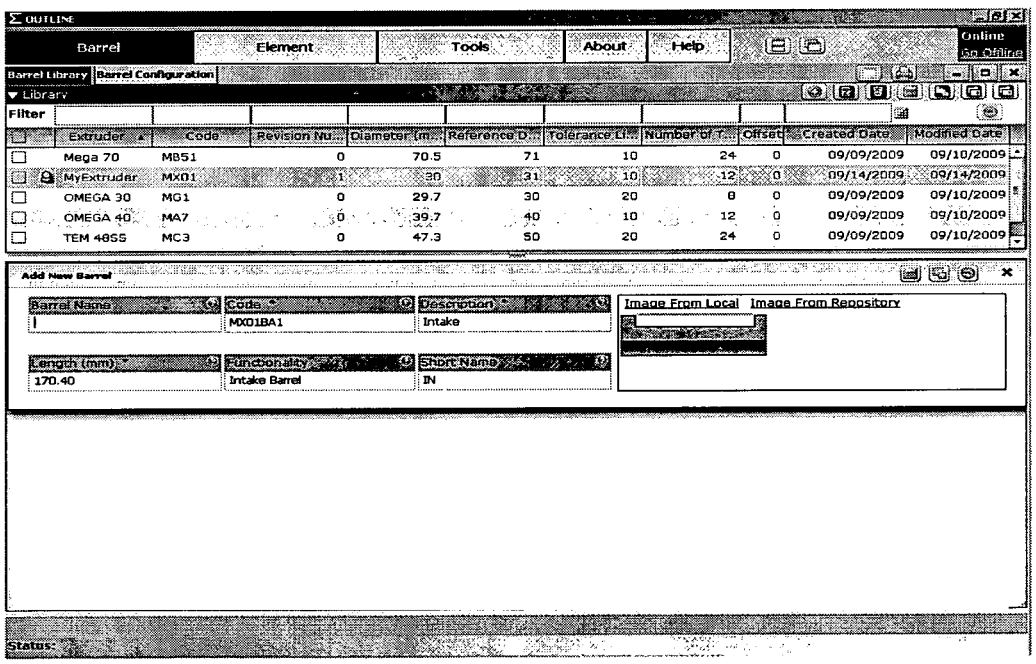
FIG. 6 illustrates a screenshot of the user interface adding a barrel.

The system may also allow users to add proprietary or custom-made elements and barrels that do not exist in the built-in element and barrel databases. By way of a specific example, FIG. 6 illustrates the process of adding a new barrel, wherein the user may enter details of the customized barrel including but not limited to the barrel name, its code, its description, its length, its functionality, its short name, and its image.

Figure 7:
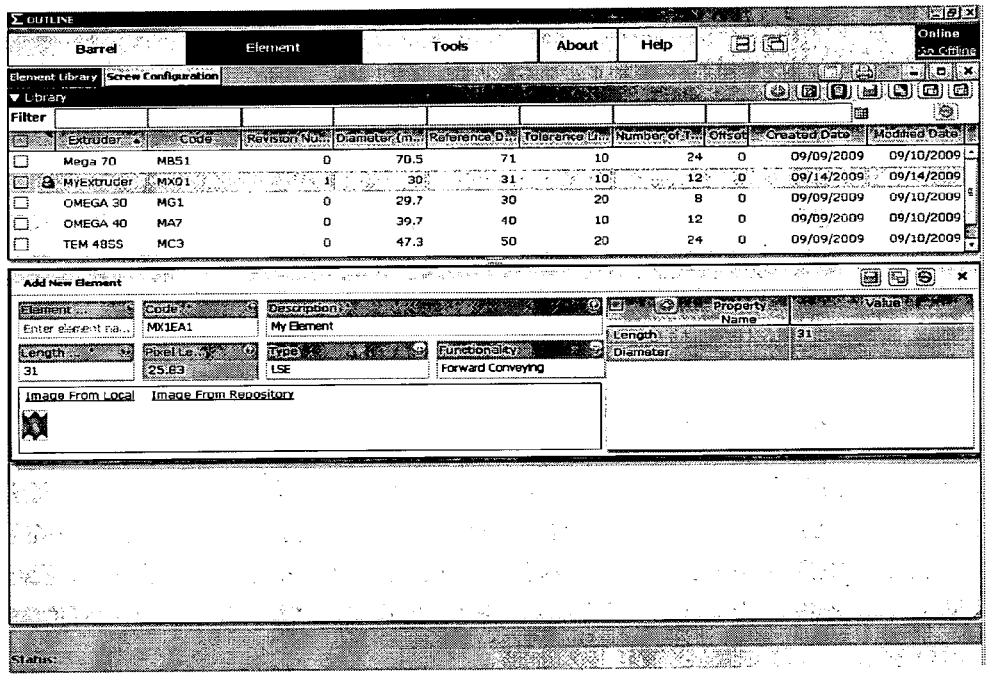
FIG. 7 illustrates a screenshot of the user interface adding an element.

By way of another example; FIG. 7 illustrates the process of adding a new element, wherein the user may enter details of the element including but not limited to its name, its code, its description, its properties, its length, its type, its functionality, and its image.

Figure 8:
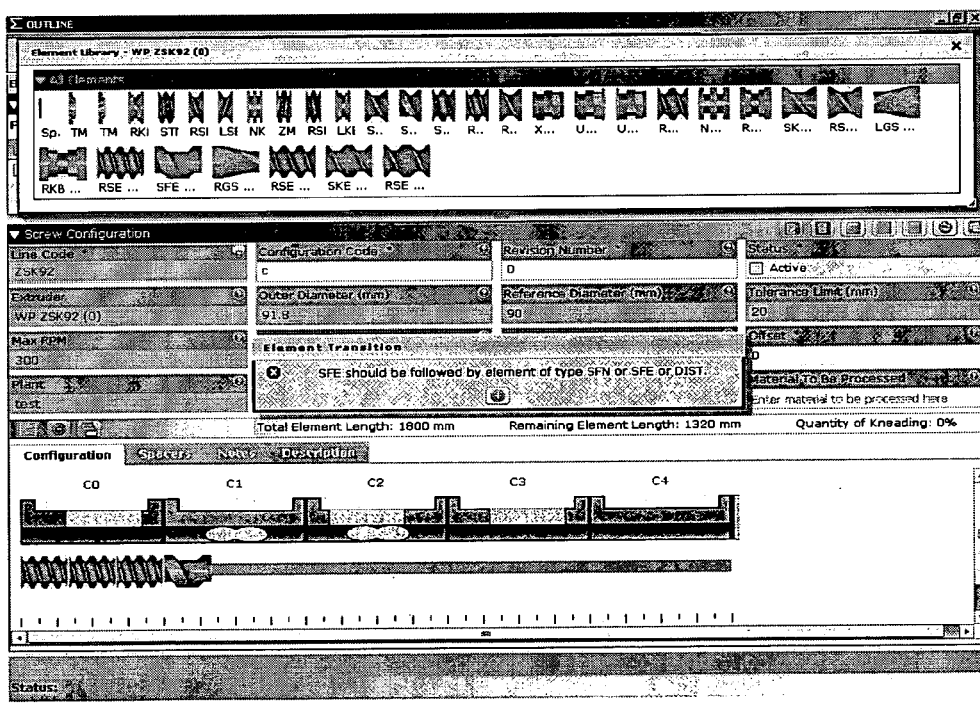
FIG. 8 illustrates a screenshot of the user interface displaying a message when incompatible elements are positioned next to each other in the screw configuration.

The system may also make reference to a database of element positioning rules executed by the element positioning engine 24 during the course of designing the configuration to prevent the design of an incorrect, physically unusable or non-implementable extruder configuration. By way of a specific example, FIG. 8 illustrates a screenshot of the system preventing the positioning and use of incompatible elements in the configuration using the database of element positioning rules. The element positioning engine implements a set of element positioning rules applicable for all or a set of extruder elements and extruders. By way of example, some of the element positioning rules are:

1. A forward conveying element (SFV) must be followed either by a forward conveying to bilobe transition element (SVN) or a forward conveying element (SFV) or a spacer (DIST) element.

2. All turbo mixing elements should be added as a pair (A, B) (i.e.) one per shaft in the twin-screw extruder.

3. A forward conveying transition (SFE to Bilobe) element (SFN) should be added as a pair (A, B) (i.e.) one per shaft in the twin-screw extruder.

4. A single flight forward conveying element (SSK) must be followed by a single flight forward conveying to bilobe transition element (SSN).

Figure 9:
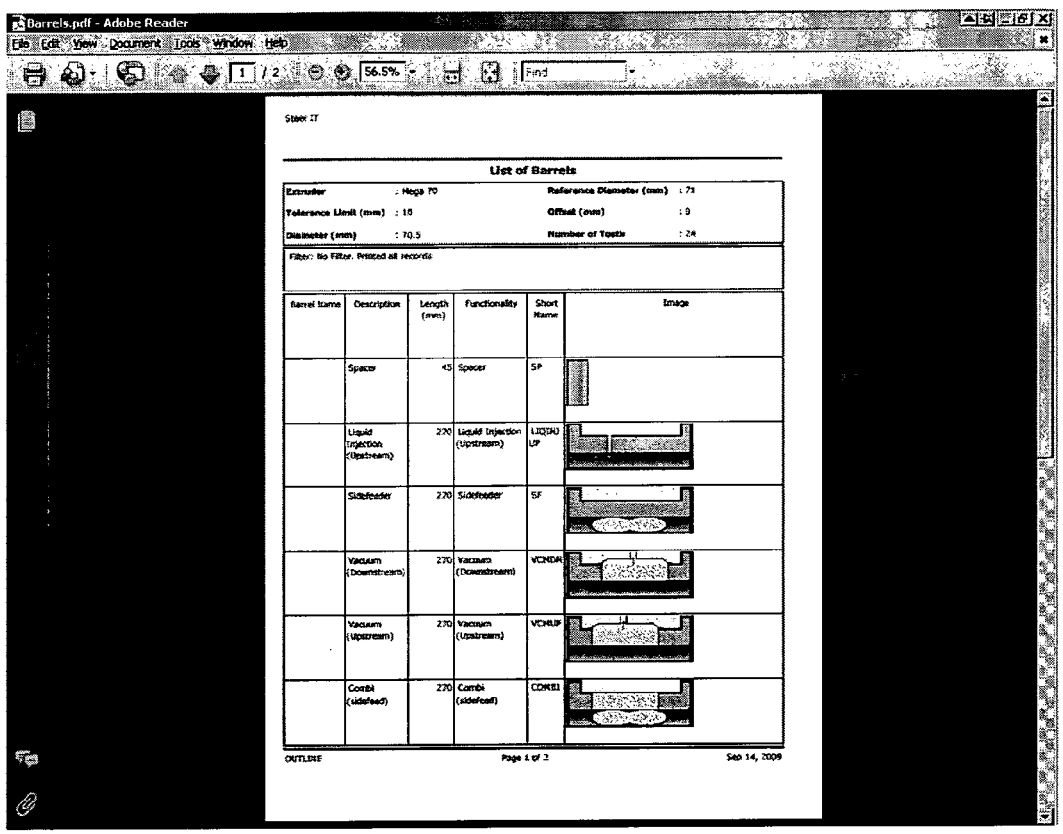
FIG. 9 illustrates a screenshot of the barrel library generated into a report.
Figure 10:
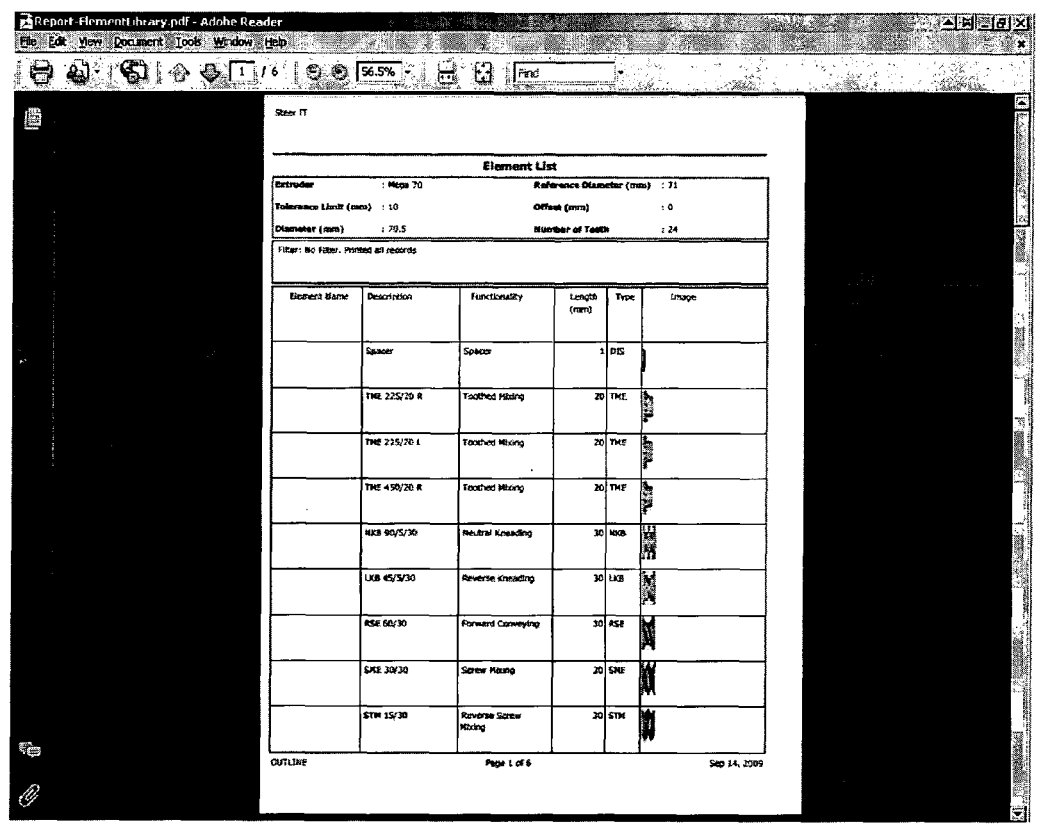
FIG. 10 illustrates a screenshot of the element library generated into a report.

In accordance with an aspect, the system may generate reports detailing the barrels and screw elements present in the configuration of the extruder. By way of an example, FIG. 9 illustrates a screenshot of a barrel database report including but not limited to the name of the extruder, its tolerance limit, its diameter, its reference diameter, its offset and number of teeth, as well as a list of the various barrels used in the configuration including but not limited to the name of the barrel, the description of the barrel, its length, its functionality, its short name and its image. By way of another example, FIG. 10 illustrates a screenshot of an element database report with various details including but not limited to the name of the extruder, its tolerance limit, its diameter, its reference diameter, its offset and number of teeth, as well as a list of the various elements used in the configuration including but not limited to the name of the element, the description of the element, its functionality, its length, its type, and its image.

Figure 11:
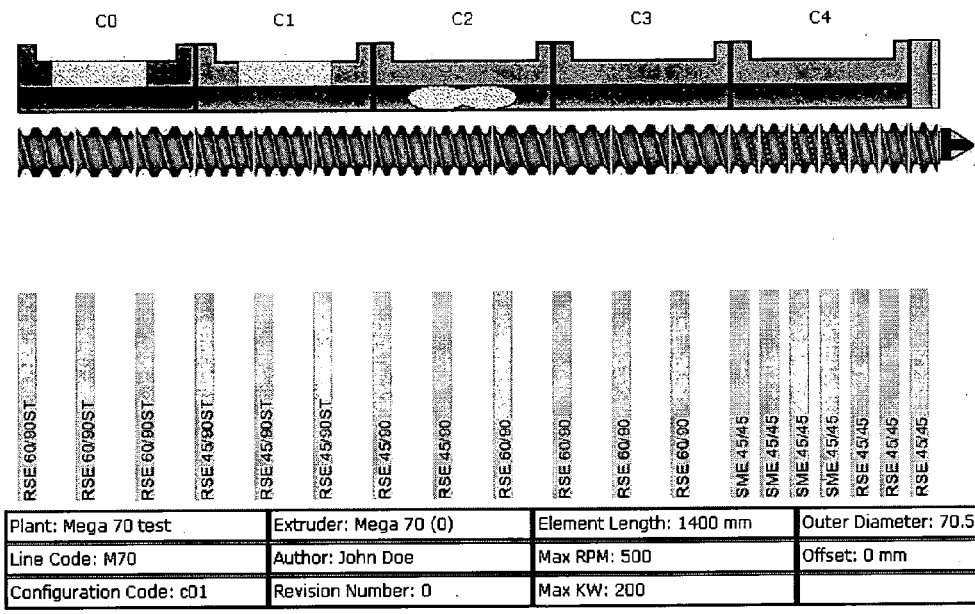
FIG. 11 illustrates a screenshot of the screw configuration generated into a report showing the elements and their properties.

In accordance with an aspect and as illustrated in FIG. 11, the system may also generate reports showing the position of barrels and elements on the extruder shaft including but not limited to a visual representation of the configuration as well as details of the plant, the line code, the configuration code, the extruder name, the author, the revision number, the element length, the maximum revolutions per minute, the maximum kilowatts, the outer diameter, and the offset.

Figure 12:
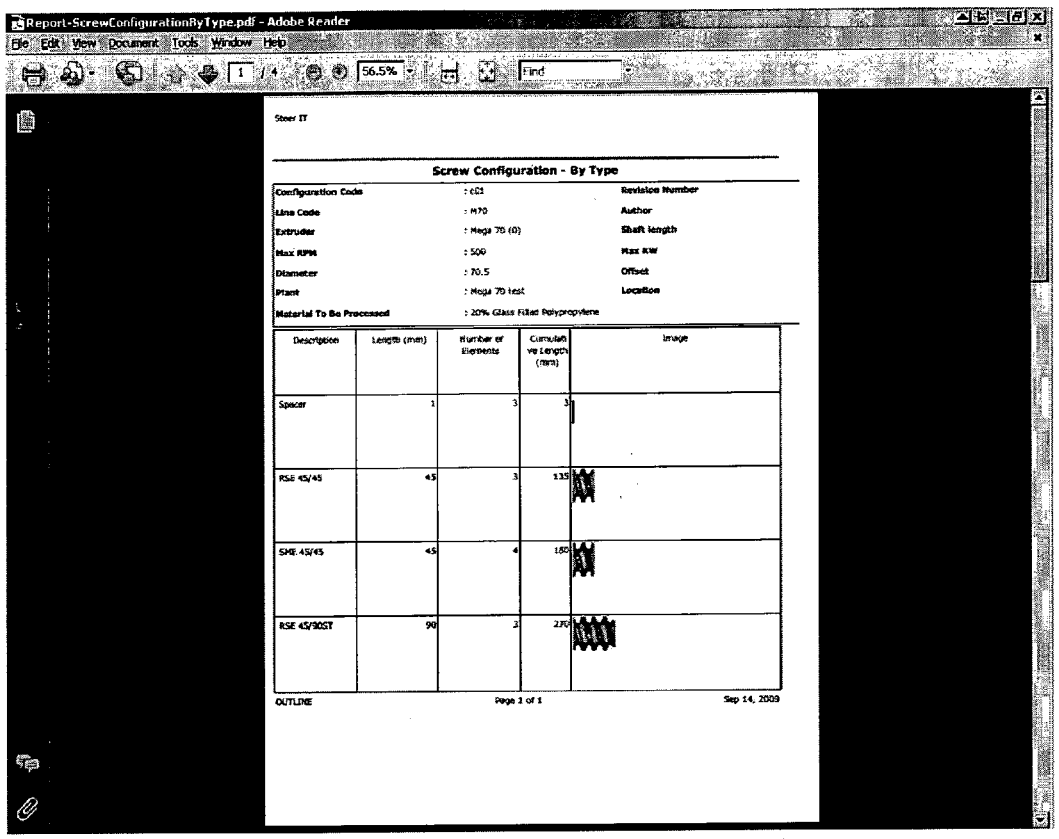
FIG. 12 illustrates a screenshot of the screw configuration generated into a report showing the elements and barrels by type (bill of material).
Figure 13:
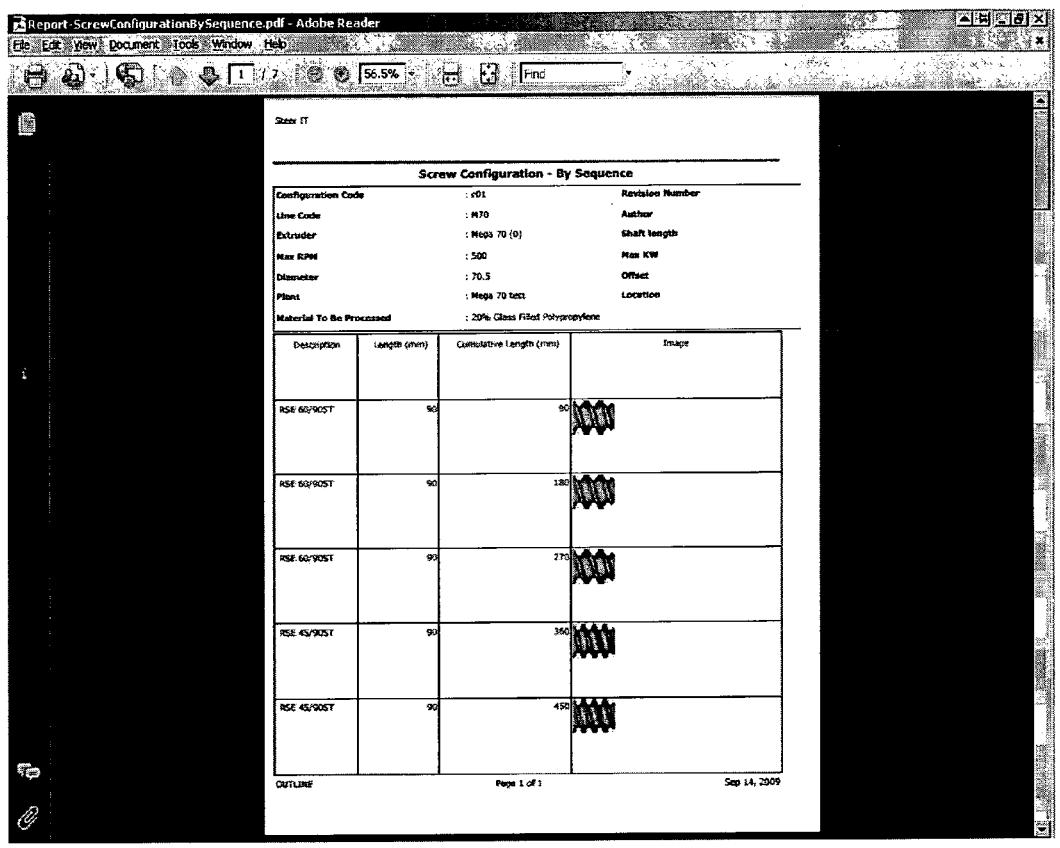
FIG. 13 illustrates a screenshot of the screw configuration generated into a report showing the elements and barrels by sequence on the extruder shaft.

In accordance with an aspect, the system may also generate reports showing the bill of materials required to construct the extruder screw configuration. By way of an example, FIG. 12 illustrates a screenshot of the report of screw configuration by type, including but not limited to the description of the screw elements used in the configuration, the lengths of each of the elements, the number of particular element types used, the cumulative lengths of each element type, and the corresponding images. By way of another example, FIG. 13 illustrates a screenshot of the report of screw configuration by sequence, including but not limited to the description of the screw elements used in the configuration, the lengths of each of the elements, the cumulative lengths of each element type, and their corresponding images.

Figure 14:
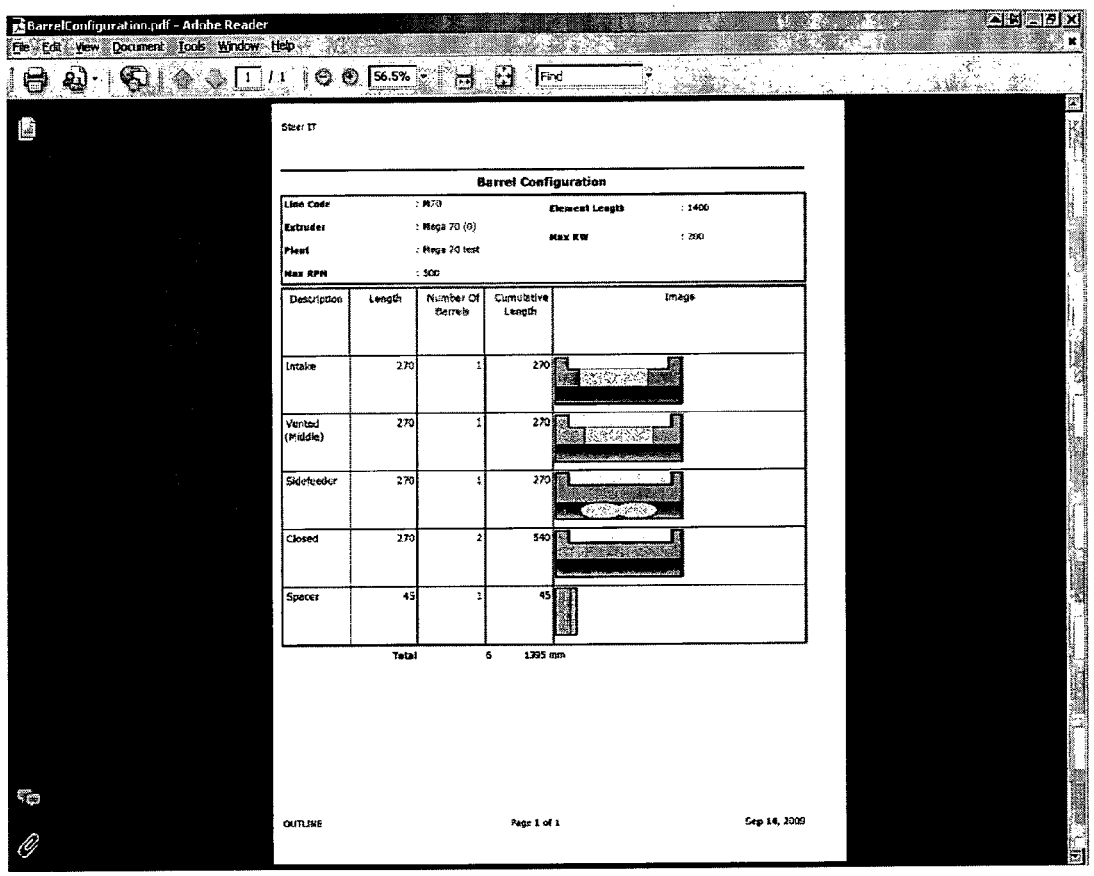
FIG. 14 illustrates a screenshot of the barrel configuration generated into a report.

In accordance with an aspect, the system may also generate reports showing the bill of materials required to construct the extruder barrel configuration. By way of an example, FIG. 14 illustrates a screenshot of a barrel configuration report including but not limited to the description of the various barrels used in the configuration, the length of each barrel, the number of such barrels used, the cumulative lengths, and an image of the corresponding barrels.

In accordance with an aspect, the reports generated by the system may be stored in a database. The database may allow the reports to be accessed, used and shared in future. The reports thus generated may be printed.

In accordance with an aspect, the extruder information database as well as the element positioning rules may be automatically updated by the system as and when the system designer makes such updates available. Such updates may be obtained from an online repository through which individual extruder configuration systems may obtain system updates. Specifically, the extruder configuration system includes a browser configured to retrieve system updates including updates for the extruder information database and/or the database of incompatible elements from an online repository. The online repository may also be an extruder configuration system to which other extruder configuration systems are linked for updates. In accordance with an aspect, the online repository is configured to push system updates to the browser configured to automatically check for and receive system updates. System updates include updates for the extruder information database and/or the database of incompatible elements from an online repository into a linked extruder configuration system. The online repository allows multi user access and may maintain a subscriber database including list of authorized users.

Specific Embodiments

An extruder configuration system comprising an extruder information database including details of extruders, extruder elements and extruder barrels; a user interface configured to receive user inputs including user choices of extruders, extruder elements or extruder barrels from the extruder information database; the user interface further configured to receive extruders, extruder elements or extruder barrels for addition to the extruder information database; an element positioning engine including a database of incompatible elements and configured to review user choices and prevent positioning of incompatible extruder elements adjacent to each other on an extruder; a processor configured to create an extruder configuration based on user inputs and a display module configured to display the extruder configuration.

Such extruder configuration system(s) further comprising an extruder database configured to store the extruder configurations.

Such extruder configuration system(s) further configured to compare the extruder configurations created by the user with one or more extruder configurations stored in the extruder configuration database.

Such extruder configuration system(s) further comprising a browser configured to retrieve system updates including updates for the extruder information database and/or the database of incompatible elements from an online repository.

Such extruder configuration system(s) wherein the online repository is configured to push system updates including updates for the extruder information database and/or the database of incompatible elements into a linked extruder configuration system.

Such extruder configuration system(s) further comprising a subscriber information database including subscriber details.

Such extruder configuration system(s) wherein details of elements in the extruder information database includes element properties.

Such extruder configuration system(s) wherein the display module is configured to display the element properties.

Industrial Applicability

The system and method as disclosed allows for designing optimum extruder configurations by using the inputs from the user and by comparing multiple configurations. The extensive in-built libraries of barrels and elements and the database of rules for usage and positioning of elements in the configuration make the design, creation and configuration of an extruder barrel and screw configuration easy and effective.

The system as disclosed provides for automatic updates of the built-in libraries of barrels and screw elements allowing up-to-date information to be available to the user. Moreover it allows for the addition of proprietary barrel and screw element types that may not be available in the in-built libraries, thereby allowing the user to customize the extruder configuration to a significant extent.

The embodiment of visualization, which provides the user with a pictorial representation of the elements on the shaft, consists of realistic images of the actual images. It allows for simple manipulation of realistic images that enhances the ability to design multiple configurations of the elements on the shaft with ease and efficiency. The visual representation, including representation of element properties, also allows the user to clearly see the position of the elements and barrels on the shaft, and where they lie in relation to other parts of the extruder. The visualization feature helps clearly conceptualize the eventual functioning of the extruder.

The system further simplifies the design of the screw configuration by allowing the user to compare element locations with respect to the barrel. It also helps maintain the shaft length requirement, and allows the implementation of changes through the process of addition or deletion. The system makes it easy to compare extruder lines through the provision of a zoom feature that gives the user a detailed view of each zone. It also includes an option to compare different configurations at the same time.

The system allows the sharing of data through a "save as picture" facility which helps in saving images in the desired directory. The system also allows the sharing of configuration information via the Extensible Markup Language (XML) format which is a general purpose and Open specification for encoding documents electronically. It also includes a print facility which prints images along with relevant data. The system allows a user to export configuration data, which is useful in comparing and sharing data with another user of the same system. The system provides customized reports based on the data that has been input. Additionally, the system may be completely customized to the needs and sector specifications of different users.

We claim:

1. A twin-screw extruder configuration system comprising:
   an extruder information database including details of extruders, extruder elements and extruder barrels;
   an extruder database configured to store extruder configurations;
   a user interface configured to receive user inputs including user choices of extruders, extruder elements or extruder barrels from the extruder information database;
   the user interface further configured to receive user-defined extruders, user-defined extruder elements or user-defined extruder barrels for addition to the extruder information database;
   an element positioning engine including a database of incompatible elements and configured to review user choices and prevent positioning of incompatible extruder elements adjacent to each other on an extruder;
   a processor configured to create a user-defined extruder configuration based on user inputs; and
   a display module configured to display the user-defined extruder configuration created based on the user inputs and at least one of the extruder configurations stored in the extruder database to allow a pictorial comparison of the user-defined extruder configuration and the at least one of the extruder configurations stored in the extruder database.

2. An extruder configuration system as claimed in claim 1 further comprising a browser configured to retrieve system updates including updates for the extruder information database and/or the database of incompatible elements from an online repository.

3. An extruder configuration system as claimed in claim 2 wherein the online repository is configured to push system updates including updates for the extruder information database and/or the database of incompatible elements into a linked extruder configuration system.

4. An extruder configuration system as claimed in claim 3 further comprising a subscriber information database including subscriber details.

5. An extruder configuration system as claimed in claim 1 wherein details of elements in the extruder information database includes element properties.

6. An extruder configuration system as claimed in claim 5 wherein the display module is configured to display the element properties.

7. An extruder configuration system as claimed in claim 6, wherein the display module is configured to display the element properties in a pop-out screen.

8. An extruder configuration system as claimed in claim 1, wherein the element positioning engine reviews user choices for conflict with an element positioning rule, wherein the element positioning rule is based on functional characteristics of the extruder elements.

9. An extruder configuration system as claimed in claim 1, wherein the element positioning engine reviews user choices for conflict with an element positioning rule expressing that a forward conveying extruder element must be followed by one of a forward conveying to bilobe transition extruder element, a forward conveying extruder element, or a spacer extruder element.

10. An extruder configuration system as claimed in claim 1, wherein the element positioning engine reviews user choices for conflict with an element positioning rule expressing that a turbo mixing extruder element must be added as one part of a pair of turbo mixing extruder elements, with each one of the pair of turbo mixing extruder elements situated on a different shaft in a twin screw extruder.

11. An extruder configuration system as claimed in claim 1, wherein the element positioning engine reviews user choices for conflict with an element positioning rule expressing that a forward conveying transition extruder element must be added as one part of a pair of forward conveying transition extruder elements, with each one of the pair of forward conveying transition extruder elements situated on a different shaft in a twin screw extruder.

12. An extruder configuration system as claimed in claim 1, wherein the element positioning engine reviews user choices for conflict with an element positioning rule expressing that a single flight forward conveying extruder element must be followed by a single flight forward conveying to bilobe transition extruder element.

13. One or more non-transitory computer-readable storage media having encoded thereon computer-executable instructions for performing a computer-implemented method comprising:
storing details of twin-screw extruders, extruder elements, and extruder barrels in an extruder information database;
storing twin-screw extruder configurations in an extruder database;
receiving user inputs including user choices of extruders, extruder elements, or extruder barrels from the extruder information database;
receiving user inputs including information defining user-defined extruders, user-defined extruder elements, or user-defined extruder barrels for addition to the extruder information database;
reviewing user choices to prevent positioning of incompatible extruder elements adjacent to each other on an extruder;
generating an extruder configuration based on the user inputs; and
displaying the extruder configuration generated based on the user inputs to allow a pictorial review of the extruder configuration generated based on the user inputs by a user, wherein the pictorial review comprises more than one extruder configuration.

14. A twin-screw extruder visualization system comprising:
a processor coupled to memory;
a database of extruder configuration information, wherein the extruder configuration information defines one or more stored extruder configurations;
a database of extruder element information, wherein the extruder element information defines a plurality of stored extruder elements;
a database of extruder barrel information, wherein the extruder barrel information defines one or more stored extruder barrels;
a database of element positioning information, wherein the element positioning information defines element positioning rules comprising:
a first element positioning rule which expresses that a forward conveying extruder element must be followed by one of a forward conveying to bilobe transition extruder element, a forward conveying extruder element, or a spacer extruder element;
a second element positioning rule which expresses that a turbo mixing extruder element must be added as one part of a pair of turbo mixing extruder elements, with each one of the pair of turbo mixing extruder elements situated on a different shaft in a twin screw extruder;
a third element positioning rule which expresses that a forward conveying transition extruder element must be added as one part of a pair of forward conveying transition extruder elements, with each one of the pair of forward conveying transition extruder elements situated on a different shaft in a twin screw extruder; and
a fourth element positioning rule which expresses that a single flight forward conveying extruder element must be followed by a single flight forward conveying to bilobe transition extruder element;
a user interface configured to receive user input from a user, wherein the user input comprises a selection of at least two extruder elements from the plurality of stored extruder elements and at least one extruder barrel from the one or more stored extruder barrels, and wherein the user input defines at least a portion of a desired extruder configuration;
an element positioning engine configured to process the user input using at least one of the element positioning rules and to warn a user upon detecting that the portion of the desired extruder configuration violates at least one of the element positioning rules; and
a display module configured to display the portion of the desired extruder configuration and at least one of the one or more stored extruder configurations to allow a pictorial comparison of the portion of the desired extruder configuration with the at least one of the one or more stored extruder configurations by the user.

15. The system of claim 14, wherein the extruder element information comprises, for at least one stored extruder element, a name of the element, a type of the element, functionality of the element, geometry of the element, a length of the element, a number of lobes of the element, a diameter of the element, and an image of the element.

16. The system of claim 14, wherein the extruder barrel information comprises, for at least one stored extruder barrel, a name of the barrel, a description of the barrel, a length of the barrel, functionality of the barrel, and an image of the barrel.

17. The system of claim 14, wherein the display module is further configured to display, for the displayed portion of the desired extruder configuration, a configuration code, a revision number, a status, a name, a diameter, a tolerance limit, a maximum rotational speed, a maximum power consumption, a length, and an author.

18. The system of claim 14, wherein the user input further comprises extruder element information defining at least one user-defined extruder element and extruder barrel information defining at least one user-defined extruder barrel, and wherein the system is configured to store the extruder element information defining the at least one user-defined extruder element in the database of extruder element information and the extruder barrel information defining the at least one user-defined extruder barrel in the database of extruder barrel information.

* * * * *